(12) United States Patent
Chen

(10) Patent No.: US 7,025,213 B2
(45) Date of Patent: Apr. 11, 2006

(54) MULTI-COMPONENT DRAIN AND SERVING TRAY ASSEMBLY

(76) Inventor: Shane Chen, 1821 NW. Eight Ave., Camas, WA (US) 98607

( * ) Notice: Subject to any disclaimer, the term of this patent is extended or adjusted under 35 U.S.C. 154(b) by 6 days.

(21) Appl. No.: 10/452,963

(22) Filed: Jun. 2, 2003

(65) Prior Publication Data

US 2004/0238438 A1 Dec. 2, 2004

(51) Int. Cl.
*B01D 24/00* (2006.01)
*B01D 29/00* (2006.01)
*B01D 35/00* (2006.01)

(52) U.S. Cl. ..................................... 210/474
(58) Field of Classification Search ............... 210/232, 210/238, 464, 469, 473, 477, 479
See application file for complete search history.

(56) References Cited

U.S. PATENT DOCUMENTS

| 1,048,546 | A | * | 12/1912 | Ketcham ..................... 210/470 |
| D105,367 | S | | 7/1937 | Swordling |
| 3,995,544 | A | | 12/1976 | Farley |
| 4,147,277 | A | | 4/1979 | Bateman |
| D314,119 | S | | 1/1991 | Kauffman |
| 5,139,166 | A | | 8/1992 | Smith |
| 5,902,481 | A | | 5/1999 | Schwietert |
| 5,988,045 | A | * | 11/1999 | Housley ..................... 99/339 |
| 6,371,470 | B1 | * | 4/2002 | Ward ..................... 269/289 R |

* cited by examiner

*Primary Examiner*—W. L. Walker
*Assistant Examiner*—Yoon-Young Kim
(74) *Attorney, Agent, or Firm*—Steven J. Adamson

(57) ABSTRACT

A multi-component drain and/or serving tray apparatus. A perforated drain tray is provided that has an opening which accommodates a drain plug. The drain plug may be configured for draining various sized canned goods. A bottom and/or top housing member may be provided to receive drainage materials or to cover food items, etc. The apparatus in various arrangements may be used for many purposes.

6 Claims, 6 Drawing Sheets

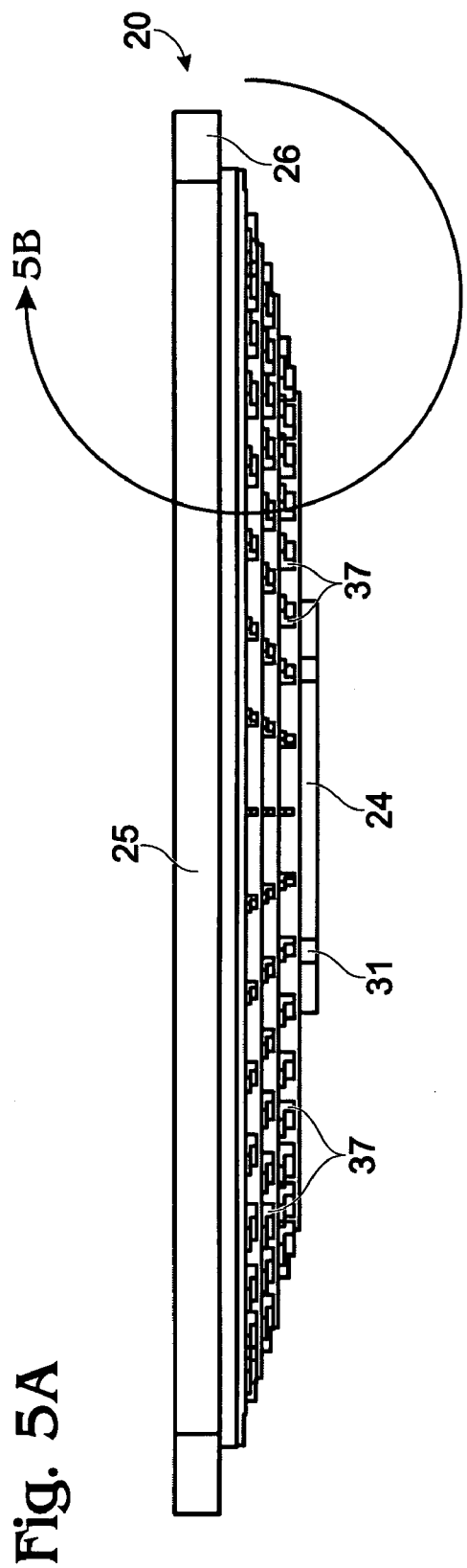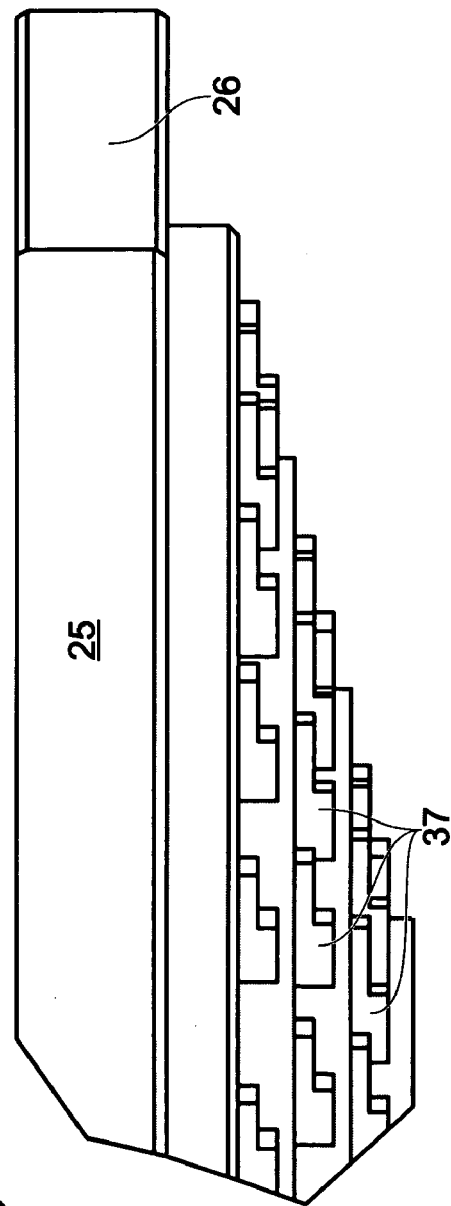
Fig. 5A
Fig. 5B

MULTI-COMPONENT DRAIN AND SERVING TRAY ASSEMBLY

FIELD OF THE INVENTION

The present invention relates to household articles for preparing, serving, cooking and/or storing food or other items. More specifically, the present invention relates to a multi-component, inter-fitting drain tray assembly that may be used for these purposes.

BACKGROUND OF THE INVENTION

The prior art is replete with various straining and draining devices. Some are specific to a particular food items (for example, U.S. Pat. Nos. Des. 278,014 and Des. 314,119 teach watermelon trays) and some are specific to a particular type of container (for example, U.S. Pat. Nos. 3,995,544 and 5,902,481 teach devices for draining a standard canned food can). Other prior art devices include general purpose serving trays such as those disclosed in U.S. Pat. Nos. 4,147,277; 5,139,166; and 6,168,813.

While these and other devices make a contribution to the serving and drain tray art, they are disadvantageous for several reasons including that they are limited to a specific function. A person, for example, that desires to drain canned goods, drain food during preparation (including cooking), marinate food items, or serve food in a manner that provides drainage would have to obtain different prior art devices for each of these functions. The result is added expense in purchasing each of these different articles and added clutter in the kitchen.

A need thus exists for a drain and serving tray assembly that provides multiple functions related to draining, serving, cooking and/or storage of various food items.

SUMMARY OF THE INVENTION

Accordingly, it is an object of the present invention to provide a drain tray assembly that includes various inter-fitting components which may be arranged in various manners to perform different functions. It is also an object of the present invention to overcome the shortcomings of the prior art.

These and related objects of the present invention are achieved by use of a multi-component drain and serving tray assembly as described herein.

In one representative, but not limiting, embodiment, the present invention may comprise a drain tray having a plurality of liquid drain openings and a drain plug opening. A drain plug may be configured for complementary resealable coupling into said drain tray. A first housing member may also be provided that may be configured in a complementary manner with the drain tray to receive liquid flowing through the drain tray.

In another embodiment, the present invention may comprise a drain tray that has a plurality of liquid drain openings and a drain plug opening. A drain plug may be configured for complementary resealable coupling into said drain tray at the drain plug opening.

In yet another embodiment, the present invention may comprise a drain tray that has a plurality of liquid drain openings and an access opening. A first housing member may be provided that includes a recess defining protrusion that is aligned with the access opening to permit access to the recess through the opening.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 5A–5B respectively illustrate a side view and a subsection view of a drain tray in accordance with the present invention.

DETAILED DESCRIPTION

Figure 1:
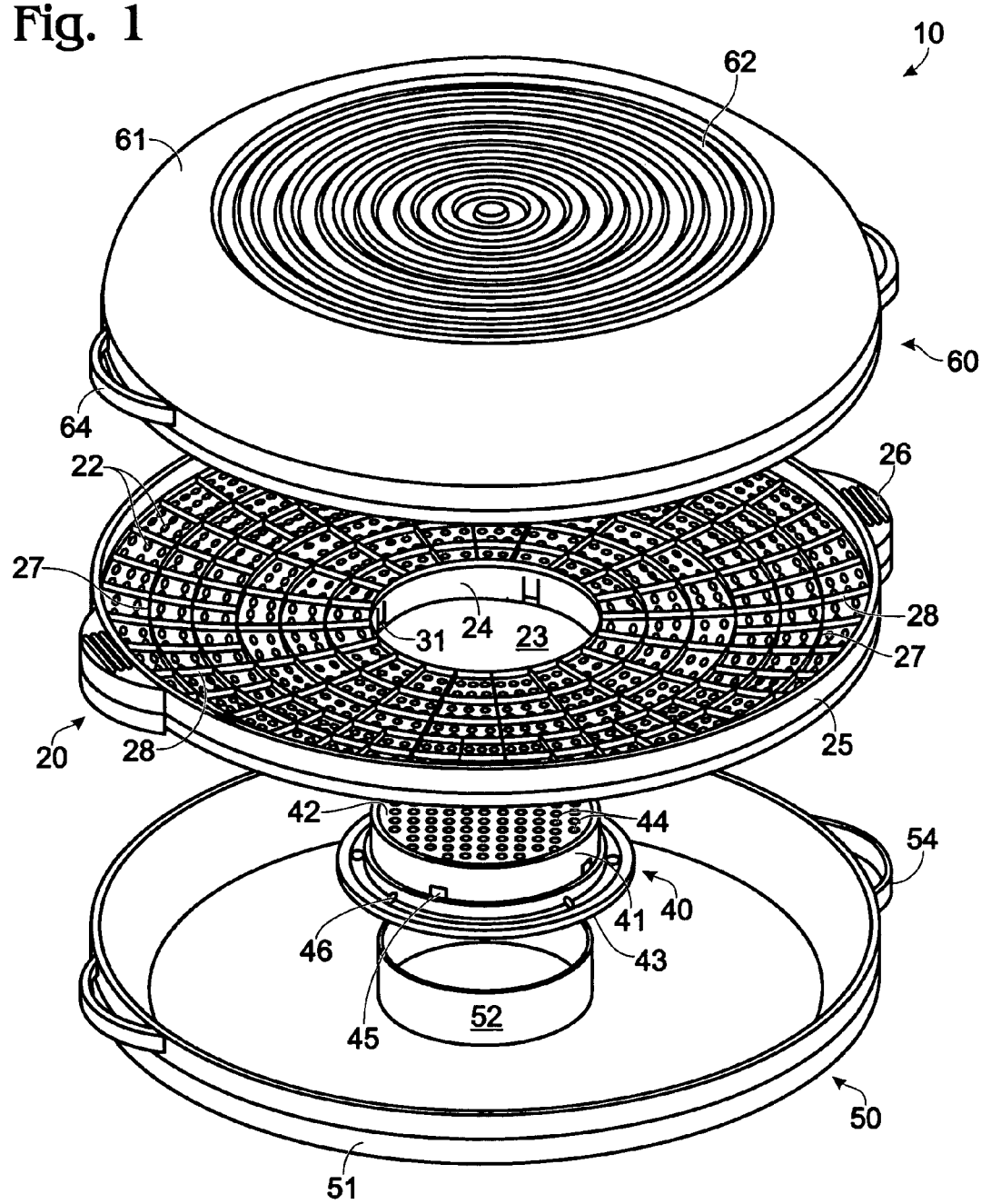
FIG. 1 is an exploded perspective view of one embodiment of a drain tray assembly in accordance with the present invention.

Referring to FIG. 1, an exploded perspective view of one embodiment of a drain tray assembly 10 in accordance with the present invention is shown. The embodiment of FIG. 1 includes a perforated drain tray 20, a drain plug 40, and first and second housing members 50, 60. Note that in practice fewer than all of these components may be utilized and the components may be re-arranged.

Drain tray 20 and drain plug 40 are preferably provided in a complementary manner such that the drain plug may be removably coupled to or inserted in a plug opening 23 in tray 20.

In the illustrated embodiment, drain tray 20 includes a drain "surface" 21 containing a plurality of drain holes or openings 22. This surface may be bordered by an inner wall 24 and an outer rim 25. A plurality of oppositely disposed or otherwise arranged handles 26 may extend from the outer rim 25. A plurality of concentric ridges 27 or like structures may be provided in the drain surface to provide structural reinforcement and to support food items placed on the tray. Radially or otherwise disposed support members 28 may also be provided. Drain openings 22 between ridges 27 and/or members 28 permit fluid to drain through tray 20. Note that while the drain tray of FIG. 1 includes concentric ridges 27 and support members 28, the surface may be otherwise configured to support items while permitting drainage including, but not limited to, smooth or undulated perforated surfaces.

The inner wall 24 defines a plug opening 23 which may be centrally located. A plurality of flexible protrusions 31 are preferably provided in inner wall 24 for releasable coupling to drain plug 40 as discussed below.

Figure 3A:
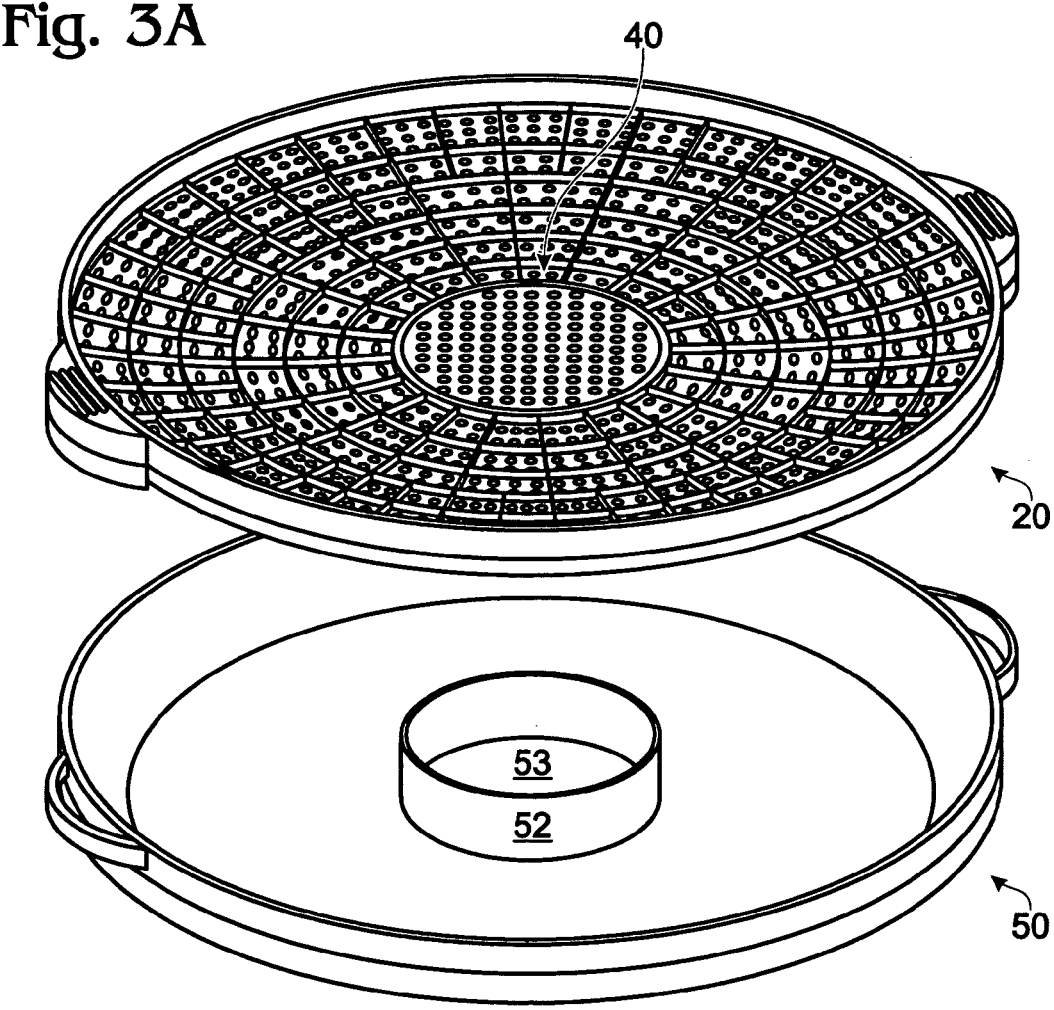
FIGS. 3A–3C illustrate various arrangements of a drain tray, drain plug and/or lower housing in accordance with the present invention.

Drain plug 40 may be used integrally with tray 20 to form an integrated perforated drain surface (as shown in FIG. 3A) or may be used individually to drain canned food goods, among other purposes. Tray 20 may also be used without drain plug 40.

Drain plug 40 may include a cylindrical side wall 41 that has a drain plate 42 coupled towards one end and an extended flange 43 coupled towards another end. The drain plate 42 preferably includes a plurality of drain openings 44 and the extended flange is preferably of sufficient width to cover the opening of various sized cans as discussed below. The side wall 41 may contain a plurality of recesses 45 that are arranged in a complementary manner with biased protrusions 31 such that the drain plug may be readily and releasably coupled to the drain tray. Support members 46 may be provided to reinforce the attachment of extended flange 43. Note that side wall 41 may or may not include drain holes.

Housing members 50 and 60 may serve as either a top housing or a bottom housing depending on a preferred arrangement to achieve a particular function. In FIG. 1, housing member 50 is provided below drain tray 20. Housing member 50 is preferably formed of a non-liquid porous material configured as a shell 51. Housing member 50 may include an inner member 52 for support and/or to define a separate compartment, for example, for dip or salsa or the like as discussed below. One or more handles 54 may extend from shell 51.

Housing member 60 is provided over drain tray 20 in FIG. 1. Housing member 60 is preferably formed of a non-liquid porous material configured as a shell 61. Housing member 60 may include a plurality of curved ridges or related structures 62 that may, for example, be used to support food items when member 60 is used as a bottom in microwave cooking or marinades, etc., as discussed below. One or more handles 64 may extend from shell 61. Note that the handles on drain tray 20 or on the first or second housing members are optional.

Figure 2A:
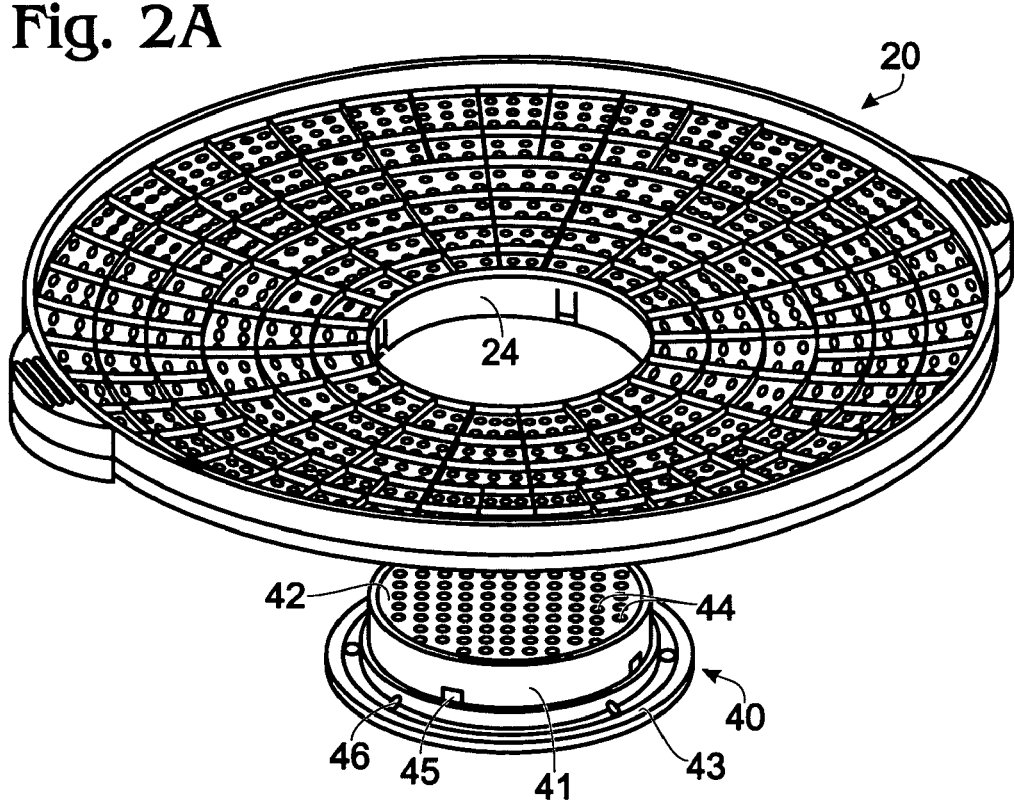
FIGS. 2A–2C are perspective views of a drain tray and a plug in accordance with the present invention.
Figure 2B:
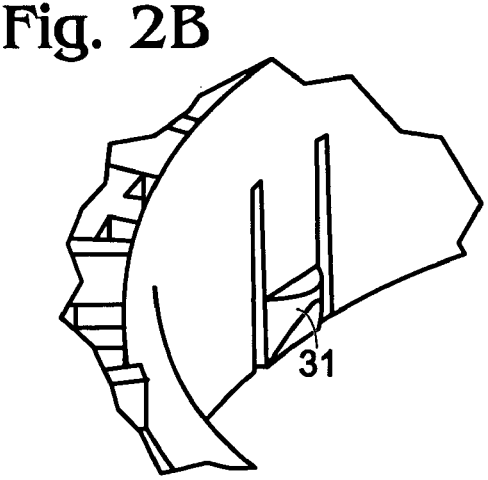
Figure 2C:
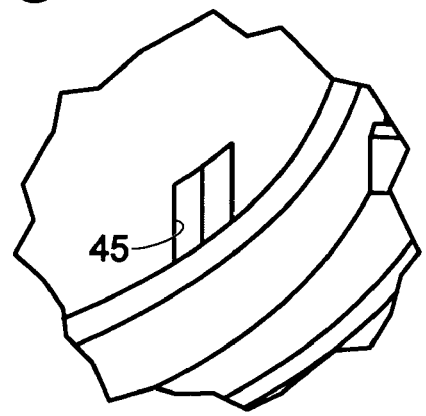

Referring to FIGS. 2A–2C, a perspective view of the drain tray and drain plug of FIG. 1 in accordance with the present invention is shown. FIG. 2A illustrates the vertical alignment of these components for mounting. Drain openings 22, inner wall 24, outer rim 25, handles 26, concentric ridges 27, support members 28 and coupling protrusions 31 are shown. The side wall 41, drain plate 42, flange 43, drain openings 44 and coupling recesses 45 are also shown.

The diameter of drain plug side wall 41 and drain plate 42 is preferably narrow enough to fit inside a standard tuna can or the like to permit drainage without spilling the desired contents. In one embodiment, the drain plate has a diameter of approximately 3" (to fit into a standard tuna can that typically has an inner diameter of approximately 3.2"). The flange may have a width of approximately ½" creating an overall diameter of approximately 4". In one embodiment with a 3.1" drain plate diameter, the outer diameter of the flange is 4.13". Note that the flange width can be decreased if so desired, or increase to permit drainage of large sized cans, for example, up to 5" or larger. Note that the diameter of inner wall 24 is preferably configured to correspond with wall 41 of the drain plug.

FIGS. 2B–2C illustrate protrusions 31 and complementary coupling recess 45. Other suitable mechanisms for releasable coupling are also within the present invention.

Figure 3B:
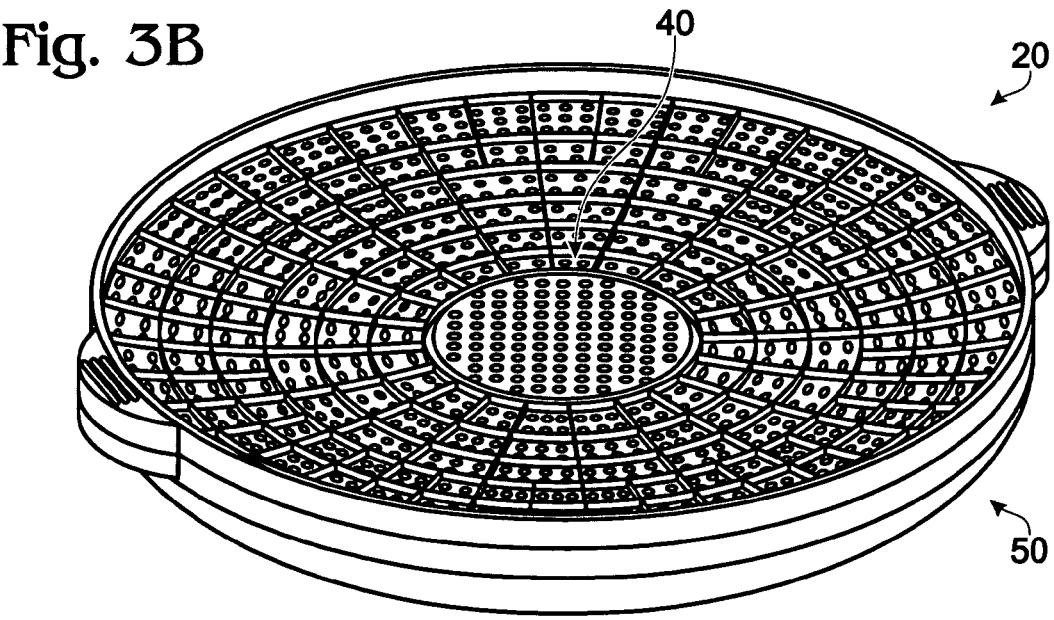
Figure 3C:
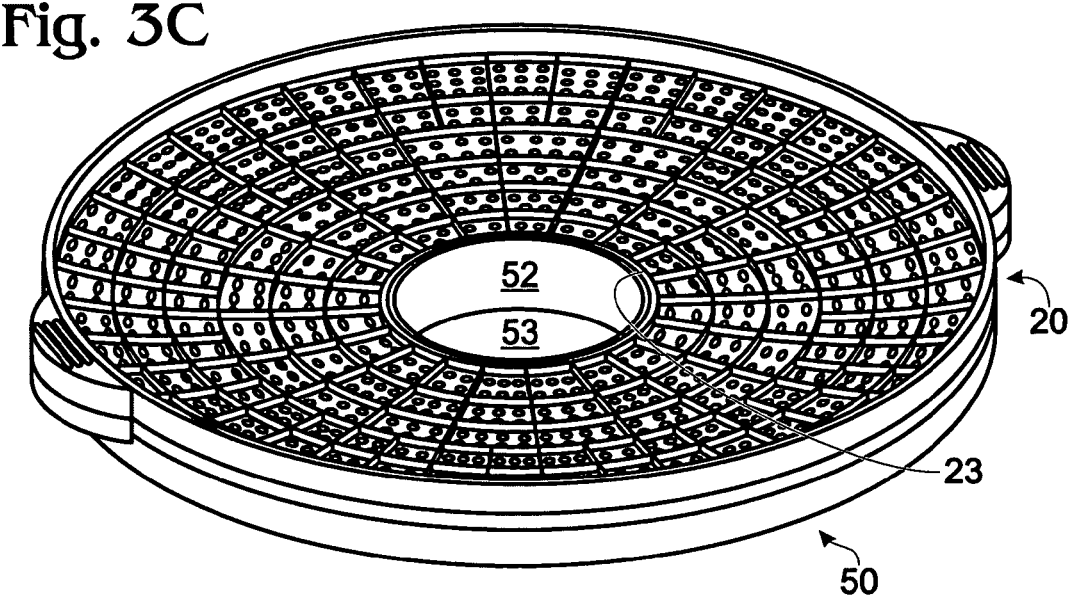

FIG. 3A–3C illustrate use of drain tray 20 with housing member 50. FIG. 3A illustrates drain tray 20 with drain plug 40 inserted therein. FIG. 3B illustrates the combined drain tray and drain plug laid into complementarily configured housing member 50. In FIG. 3C, the drain plug 40 is removed such that recess 53, defined by protrusion 52, is accessible through drain plug opening 23 in drain tray 20.

Figure 4:
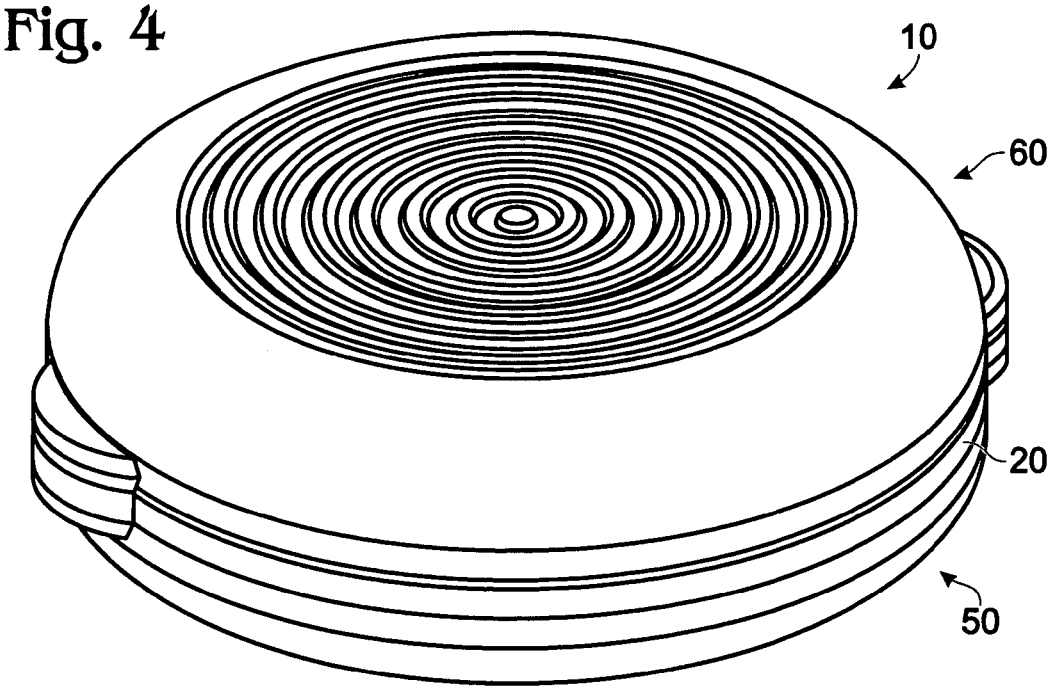
FIG. 4 is an "unexploded" perspective view of the assembly of FIG. 1 in accordance with the present invention.

FIG. 4 illustrates device 10 of FIG. 1 in an unexploded manner. Drain tray 20 may be seated in housing member 50 such that handles 26 fit within handles 54. Housing member 60 in mounted over this arrangement such that handles 64 align with handles 26. Note that the housing members 50 and 60 are configured for complementary mounting to one another when tray 20 is not provided. In this capacity they may be used for food storage or microwave cooking, etc., and they may be inverted, for example, to make use of ribs 62.

FIGS. 5A–5B illustrate one embodiment of drain tray 20 in cross-section. While tray 20 is shown as being recessed in FIGS. 5A–5B, note that it may be flat or otherwise configured. FIG. 5A illustrates that the bottom surface of tray 20 may include a plurality of stepped members or sections 37 that are staggered in height and arranged concentrically. These members or sectors 37 permit a relatively snug insertion of drain tray 20 into and across the tops of various sized circular pots, for use in straining material, e.g., pasta, etc., from those pots.

Figure 6:
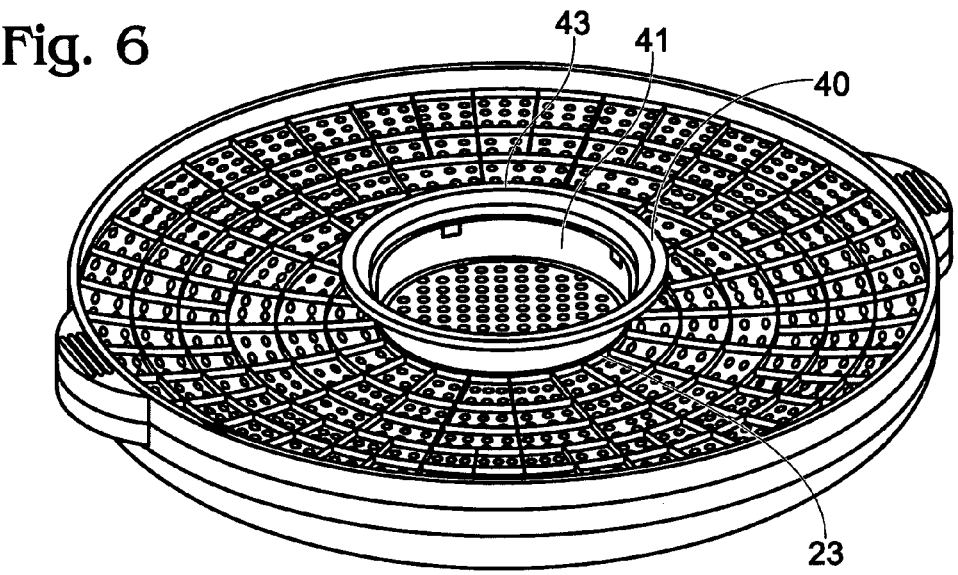
FIG. 6 is a perspective view of a drain tray with the drain plug inverted in accordance with the present invention.

FIG. 6 illustrates another arrangement of drain tray assembly 10 of FIG. 1 in which drain plug 40 is inverted and positioned on the top portion of plug opening 23. Flange 43 is disposed upward in this arrangement. This arrangement, for example, could be used to receive olive pits or hold tooth picks or the like.

Figure 7:
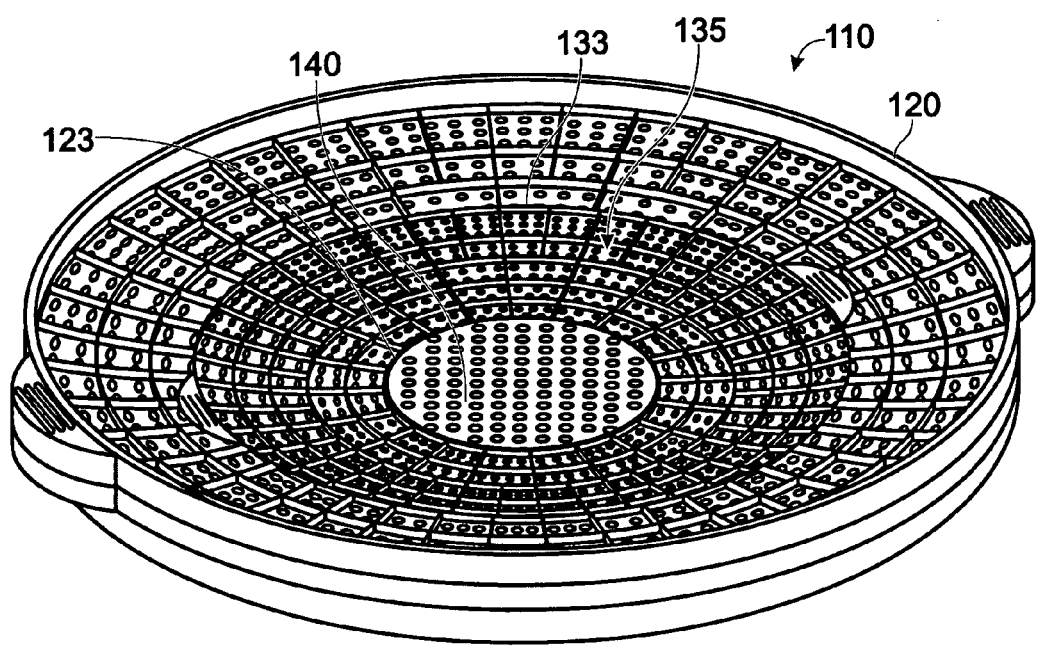
FIG. 7 is a perspective view of a drain tray assembly having a supplemental drain plug section in accordance with the present invention.

FIG. 7 illustrates another embodiment of a drain tray assembly 110 in accordance with the present invention. The assembly of FIG. 7 includes a drain tray 120, a supplemental drain section 135 and a drain plug 140. Section 135 is releasably coupled to drain tray 120 at opening 133 (in much the same manner that drain plug 40 is coupled to drain tray 20), and drain plug 140 is releasably coupled to section 135. The provision of two removable sections increases the use options for the tray assembly of the present invention. An additional protrusion, similar to protrusion 52, may be provided in substantial alignment with opening 133 or elsewhere.

The components of assembly 10 and 110 may be made of extruded plastic. Note, however, that other materials such as metal (except for microwave applications), wood, ceramic or other materials or a mix of materials may be used.

Uses

The present invention, in various arrangements, may be used in a variety of different ways. For example, providing only drain tray 20 in housing 50, a serving tray for dry or wet items is provided. Food items such as vegetables or chips may be provided on the drain tray, while dip or salsa or other items (cheese, olives, etc.) may be provided in recess 53. Housing member 60 may be provided over these food items before and/or after use to keep them fresh.

Alternatively, the drain plug may be provided in the tray, resulting in a continuous drain surface and eliminating access to recess 53. Wet or dry items may be provided directly on this continuous surface. For example, food items may be rinsed and set directly on this surface to drain while they are set out for serving or stored in the refrigerator.

The materials selected for the components of the present invention are preferably but not necessarily microwave safe. Items may thus be set on the continuous drain surface of the tray-with-plug combination and cooked or defrosted in a microwave oven. Fats, moisture or other substances cooked out of food during microwave heating may be passed through the drain tray and be collected by housing member 50 (or housing member 60 if it is used as a bottom). Housing member 60 may be used as a cover to prevent splashing. This cover may also be provided for use in microwave "steaming" and/or for food storage.

If housing members 50, 60 are inverted, then the ringed protrusions 62 or otherwise shaped protrusions provide an enhanced marinating function (preferably without the drain tray). The protrusions hold food items off the bottom so that more surface area of the food item is exposed to the marinade. The protrusions may also enhance structural integrity.

Note also that drain tray assemblies 10 and 110 may be used as a strainer as mentioned above.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A drain tray assembly, comprising:
    a drain tray having a plurality of liquid drain openings and a drain plug opening;
    a drain plug configured for complementary and secure resealable coupling into said drain tray at said drain plug opening;
    a first housing member that is substantially non-liquid porous and configured in a complementary manner with said drain tray such that when said drain tray is placed on said first housing member liquid flowing through said drain tray is received by said first housing member; and
    a second housing member that is substantially non-liquid porous and configured in a complementary manner with said drain tray and said first housing member so as to cover said drain tray;
    wherein said drain plug is configured to define a plurality of liquid drain openings therein and to include a substantially cylindrical side wall and a drain plate coupled thereto in which said plurality of drain plug liquid drain openings are provided;
    wherein said drain plug further comprises a circumferencial flange extending from said cylindrical side wall, said flange having a width of approximately 30% or more of the radius of said drain plate as bordered by said cylindrical side wall;
    wherein said first housing member includes a recess defining protrusion that is substantially aligned with said drain plug opening so that when said drain tray is placed on said first housing member without said drain plug, said recess is accessible through said drain plug opening; and
    wherein said drain tray is configured to have one of paired complementary mounting structures and said drain plug is configured to have the other of said mounting structures such that said paired complementary mounting structures positively engage to achieve the releasable secure coupling of said drain plug to said drain tray.

2. The assembly of claim 1, wherein said drain tray includes a plurality of upwardly disposed concentric ridge protrusions.

3. The assembly of claim 2, wherein at least two of said ridge protrusions have a height relative to their adjacent protrusion that is higher than that adjacent protrusion.

4. A drain tray assembly, comprising:
    a drain tray that has a plurality of liquid drain openings and a drain plug opening; and
    a drain plug that is configured for complementary and secure resealable coupling into said drain tray at said drain tray opening;
    wherein said drain plug opening is substantially centrally located in said drain tray and said drain plug defines a plurality of drain plug liquid drain openings therein;
    wherein said drain tray includes a top surface and said top surface includes a plurality of upwardly disposed concentric ridge protrusions, at least two of which have a height relative to their adjacent protrusion that is higher than that adjacent protrusion;
    wherein said drain tray is configured to have one of paired complementary mounting structures and said drain plug is configured to have the other of said mounting structures such that said paired complementary mounting structures positively engage to achieve the releasable secure coupling of said drain plug to said drain tray; and
    wherein said drain plug includes a drain plate in which said plurality of drain plug liquid drain openings are provided and a flange extending from said drain plate, said flange having a width dimension of approximately 30% or more of the radius of said drain plate.

5. The assembly of claim 4, wherein said drain tray includes a bottom surface and said bottom surface includes a plurality of radially staggered members that descend relative to one another.

6. The assembly of claim 4, wherein said drain plug is comprises of at least of a first annular section and a separately detachable second annular section.

* * * * *